(12) United States Patent
Stevens et al.

(10) Patent No.: US 9,157,383 B2
(45) Date of Patent: *Oct. 13, 2015

(54) SYSTEM, METHOD AND COMPUTER PROGRAM FOR SIMULATING VEHICLE ENERGY USE

(71) Applicant: CROSSCHASM TECHNOLOGIES INC., Waterloo (CA)

(72) Inventors: Matthew Stevens, Kitchener (CA); Christopher J. Mendes, Kitchener (CA)

(73) Assignee: CROSSCHASM TECHNOLOGIES INC., Waterloo, Ontario (CA)

( * ) Notice: Subject to any disclaimer, the term of this patent is extended or adjusted under 35 U.S.C. 154(b) by 16 days.

This patent is subject to a terminal disclaimer.

(21) Appl. No.: 13/965,639

(22) Filed: Aug. 13, 2013

(65) Prior Publication Data

US 2014/0214311 A1    Jul. 31, 2014

Related U.S. Application Data

(63) Continuation of application No. 13/143,948, filed as application No. PCT/CA2010/001497 on Sep. 24, 2010, now Pat. No. 8,543,287.

(60) Provisional application No. 61/245,868, filed on Sep. 25, 2009.

(51) Int. Cl.
*F02D 19/02* (2006.01)
*G06Q 10/04* (2012.01)
*G07C 5/00* (2006.01)
*G07C 5/08* (2006.01)

(52) U.S. Cl.
CPC .............. *F02D 19/026* (2013.01); *G06Q 10/04* (2013.01); *G07C 5/008* (2013.01); *G07C 5/0816* (2013.01)

(58) Field of Classification Search
USPC ........... 701/29.1, 29.3, 32.1, 32.7, 32.9, 33.4, 701/34.2, 34.4, 36, 104
See application file for complete search history.

(56) References Cited

U.S. PATENT DOCUMENTS

| | | |
|---|---|---|
| 6,242,873 B1 | 6/2001 | Drozdz et al. |
| 6,975,309 B2 | 12/2005 | Tamura et al. |
| 8,359,134 B2 | 1/2013 | Maesono |
| 8,392,105 B2 | 3/2013 | Desborough |
| 2007/0129878 A1 | 6/2007 | Pepper |

FOREIGN PATENT DOCUMENTS

| | | |
|---|---|---|
| WO | 2009033460 A1 | 3/2009 |
| WO | 2010112872 A1 | 10/2010 |

*Primary Examiner* — Richard Camby (74) *Attorney, Agent, or Firm* — Norton Rose Fulbright Canada LLP (57) ABSTRACT

A system, method and computer program for simulating vehicle energy use is provided. Drive cycle data collected during real-world driving of at least one vehicle is received by at least one computing device, and engine torque information associated with the real-world driving of the at least one vehicle is also received. Vehicle payload mass of the at least one vehicle is estimated based at least partly on the respective received engine torque information, and energy use of the at least one vehicle is estimated based at least partly on the respective drive cycle data, the respective torque information, and the estimated vehicle payload mass.

37 Claims, 4 Drawing Sheets

SYSTEM, METHOD AND COMPUTER PROGRAM FOR SIMULATING VEHICLE ENERGY USE

CROSS-REFERENCE TO RELATED APPLICATIONS

This application is a continuation of U.S. patent application Ser. No. 13/143,948, filed on Jul. 11, 2011, which is a National Stage entry from PCT patent application No. PCT/CA2010/001497, filed Sep. 24, 2010, claiming priority from U.S. patent application No. 61/245,868, filed Sep. 25, 2009, the entirety of each of which is hereby incorporated by reference in its entirety.

FIELD OF THE INVENTION

The present invention relates generally to simulating vehicle energy use. The present invention more specifically relates to accurately simulating vehicle energy use based on vehicle modeling and drive cycle data.

BACKGROUND

A vehicle purchaser can realize fuel savings by purchasing an electrified or semi-electrified vehicle. However, these vehicles are typically more capital intensive to purchase than their conventional vehicle counterparts. Identifying the fuel savings by purchasing an electrified or semi-electrified vehicle can be difficult. Thus, it is important to be able to accurately determine the return-on-investment to the purchaser before purchase. Unfortunately, determination of these savings is difficult due to the high dependency of energy consumption on the real-world drive cycle. Therefore, identifying the appropriate application of hybrid/electric vehicles is important both to the manufacturer of the vehicles, as well as the potential purchaser.

Currently, the vehicle manufacturer either markets the fuel consumption of the vehicle as tested on government mandated test procedures, or as measured in real-world fuel consumption in specific applications. Unfortunately, in most cases purchasers find the true fuel consumption to be greater than that advertised by the manufacturer. This is typically due to a mismatch between the drive cycles that the vehicle is tested on, and the drive cycle that the vehicle is experiencing in use. The net effect is disappointed vehicle purchasers, and negative publicity for these vehicles for not living up to advertised expectations.

Vehicle simulation software is currently available. Two providers of such simulation tools are ANL (PSAT simulation software) and AVL (Advisor simulation software). Typically these tools are used for vehicle design purposes by large automotive design firms. These software packages are extremely complex and their use requires an engineer experienced in vehicle design. They are, for this reason, limited to vehicle manufacturers.

Simple vehicle return on investment (ROI) calculators also exist. These rely on advertised fuel consumption values to determine fuel costs. While this is the obvious approach, experience with hybrid and electric vehicles indicates that these analyses can be very misleading since the advertised fuel consumption can be in significant error due to actual drive cycle.

Calculating the fuel consumption of a vehicle from ODBII diagnostic data is straightforward as provided in Canadian patent application 2,541,593. This method is useful to determine fuel consumption of vehicles already in one's possession, however, it does not solve the issue of predicting fuel consumption of a vehicle (or set of vehicles) before their purchase.

Furthermore, there are methods for estimating the mass of a vehicle, as is provided in U.S. Pat. No. 6,347,269.

Nevertheless, there is no currently existing technique for accurately simulating the fuel usage of a vehicle under consideration for purchase.

What is required, therefore, is a tool for accurately simulating the fuel usage of a vehicle under consideration for purchase.

SUMMARY OF THE INVENTION

The present invention provides a system for simulating energy use of one or more vehicles under consideration, the system characterized by: (a) a network accessible server; (b) an energy modeling tool linked to the server by means of the network, the energy modeling tool operable to generate energy consumption data that provides an energy consumption function of a vehicle under consideration; (c) a data logging tool associated with one or more test vehicles for collecting one or more sets of drive cycle data based on real-world driving conditions, the data logging tool operable to communicate the drive cycle data to the server over the network; and (d) a fleet management tool linked to the server for combining the energy consumption data with the drive cycle data to estimate the energy use of the one or more vehicles under consideration.

The present invention also provides a method for simulating energy use of one or more vehicles under consideration, the method characterized by: (a) generating energy consumption data for a vehicle under consideration, the energy consumption data providing an energy consumption function of the vehicle under consideration; (b) collecting one or more sets of drive cycle data based on real-world driving conditions associated with one or more test vehicles; and (c) combining the energy consumption data with the drive cycle data to estimate the energy use of the one or more vehicles under consideration.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

The present invention provides a system, method and computer program for simulating energy use of an asset under consideration, such as a vehicle, for example. The simulation uses vehicle modeling and drive cycle data to accurately reflect real-world conditions rather than relying on manufacturer-supplied data. The simulation allows prospective vehicle purchasers, for example, to more closely predict their return-on-investment, energy (fuel) savings, vehicle range, and reduction in emissions by generating higher accuracy energy consumption predictions than would otherwise be possible. The simulation also allows vehicle manufacturers, for example, to achieve significant benefits from obtaining real-world usage data from their customers that can be used to inform vehicle design decisions. The term 'vehicle' herein refers to any sort of powered mobile transportation device, including passenger vehicles as well as industrial equipment, commercial vehicles, automated equipment, robots, aerial conveyances, etc. Furthermore, the simulation may be implemented for non-vehicular simulation such as any implementation where a usage profile can be developed that makes the energy calculation non-trivial, particularly where there are new energy efficient devices available to be purchased. For example, the system may be implemented for simulation of manufacturing plant components or home electrical components. Therefore, it should be understood that references herein to a "vehicle" may be applied to any other asset for which energy simulation can be applied. Similarly, references herein such as "drive cycle data" should be understood to refer generally to "asset usage data", and so on. Furthermore, environmental factors described herein may include vehicle-specific environmental factors, however it should be understood that other environmental factors that may be specific to other assets are contemplated.

One particular example of an implementation of the invention is an application where there is significant variation in duty cycles (for example, both within vehicle fleets and across vehicle fleets) and which accepts, for example, hybrid electric vehicles, plug-in hybrid electric vehicles, or other technology that is drive cycle dependant.

In one example implementation, a prospective purchaser of an electrified or semi-electrified (hybrid) vehicle can more closely predict their return-on-investment, energy savings, and reduction in emissions by generating higher accuracy energy consumption predictions and/or vehicle range predictions than would otherwise be possible.

Figure 1:
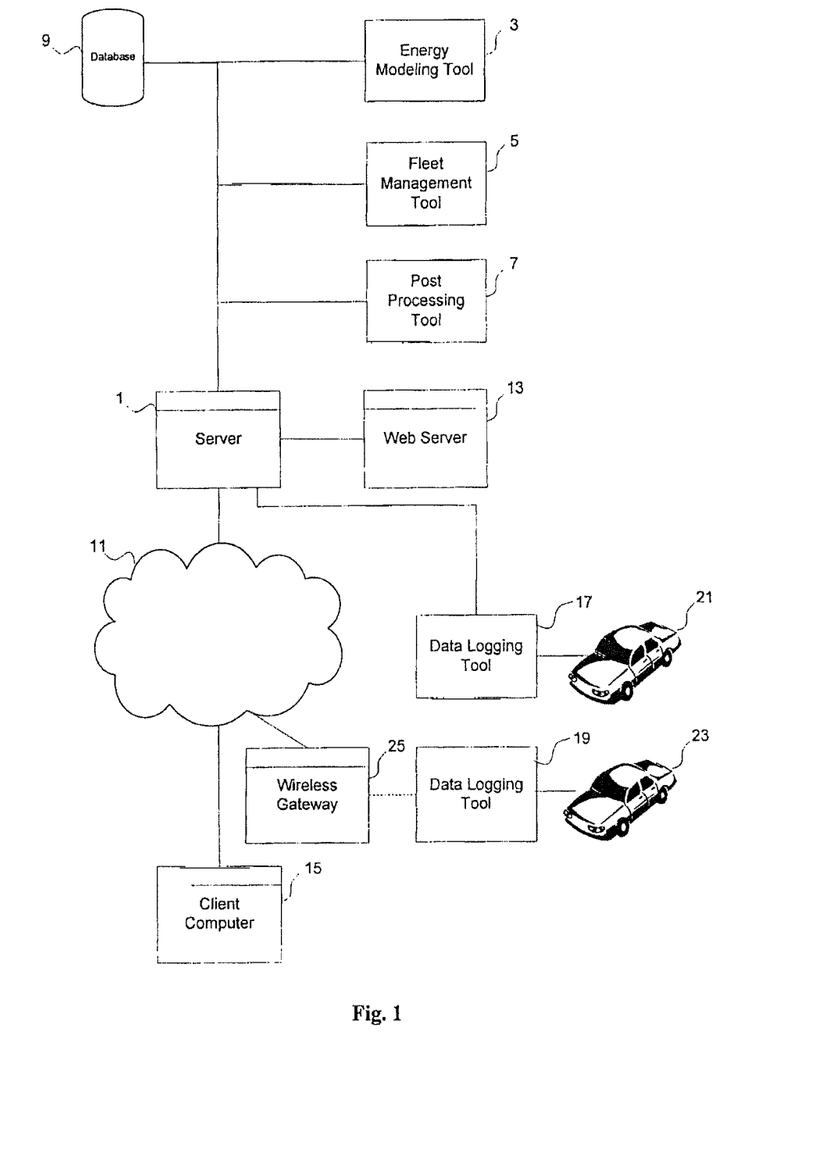
FIG. 1 illustrates a system implementation in accordance with the present invention.

FIG. 1 illustrates a system implementation in accordance with the present invention. A server (1) is provided for collecting drive cycle data, accessing an energy modeling tool (3), and processing simulations using a fleet management tool (5), each of which are linked to the server (1) by a network (11). A post processing tool (7), linked to the server (1), may also be provided for aggregating a plurality of simulations. The energy modeling tool (3) and fleet management tool (5) may be linked to one or more databases (9) for storing vehicle models and drive cycle data, respectively. A particular implementation further contemplates that the one or more databases (9) includes a speed limit database. Any or all of the databases may be relational databases. A post-processing tool may also be linked to the server for enabling further analysis of the simulations by a purchaser.

The server may be accessible via a network (11), such as the Internet or a local or wide area network, and may also include or be linked to a web server (13) for enabling a purchaser to access a web-accessible user interface on a client computer (15) for interacting with the fleet management tool (5).

A plurality of data logging tools (17, 19) may be provided, each data logging tool being linked to or associated with a vehicle (21, 23) to collect drive cycle data from the vehicle. For example, each data logging tool (17, 19) may be linked to its respective vehicle by means of an On-Board Diagnostic (OBD) port (or OBD-II port), or other data port, of the vehicle. The use of the OBD port enables very fast installation of the data logging tool to a vehicle. For assets that are not vehicles, a similar means of collecting asset usage data may be used as a link between the data logging tool and the asset. An alternative implementation can be achieved by linking a data logging tool to a vehicle by means of a J1939 diagnostics port of a vehicle. The J1939 has a list for standard/suggested signals also known as PGNs. From the suggested PGN list, a set of messages can be selected, including Vehicle ID, Vehicle speed, (navigation based), Vehicle speed (wheel based), Latitude, Longitude, Engine Speed, Actual Engine Per Torque, Engine Demand—Percent Torque, Drivers Demand Eng Percent Torque, Reference Engine Torque, Engine Gas Mass Flow Rate 1 and Engine Coolant Temperature. A GPS antenna and GSM modem may further be linked to the data logging tool to provide location data to enable route identification and remote data harvesting, respectively.

The data logging tool may, alternatively or in addition, include a device associated with the vehicle and operable to generate drive cycle data, such as speed vs. time data, for the vehicle. For example, the data logging tool may be (or may include) a GPS-enabled device that is placed in the vehicle (but not necessarily connected by wired or wireless communications to an electronic system of the vehicle). For example, the data logging tool may be provided by a GPS device or a wireless smartphone having GPS capability, provided that such a data logging tool in is in (or in substantial proximity to) the vehicle during the collection of the drive cycle data.

Each data logging tool (17, 19) may also be linked to the server (1) by a wired or wireless link. Each data logging tool (17, 19) may be operable to communicate collected drive cycle data to the server (1) for recording on the database (9). For example, the server may be linked to a wireless gateway (25) enabling a wireless communication link between the data logging tools (17, 19) and the server (1). The link may be persistent or intermittent. As such, each data logging tool (17, 19) may include or be linked to a data memory, which may be used to store drive cycle data prior to communicating the drive cycle data to the server. The drive cycle data can then be retained or deleted from the data logging tool. The server (1) may also be equipped with wired connections for collecting drive cycle data, for example from an On-Board Diagnostic (OBD) port of each vehicle. Alternatively, the data logging tool may be linkable to a client computer that has a link to the server, such that the data logging tool may transmit drive cycle data to the client computer and the client computer may then transmit the drive cycle data to the server.

It should be understood that the system may be executable on one or more computers owned by the prospective purchaser, the manufacturer, or a third party or may be implemented as a single combined program running on a single computer. An embodiment of the invention may comprise one or more special purpose or general purpose computers or servers, each of which may include, but are not limited to, one or more processors, memories, storage devices, input/output devices and a network interface. For the purpose of explanation, the terms 'computer' and 'server' may be interchangeable in accordance with the above description.

Figure 2:
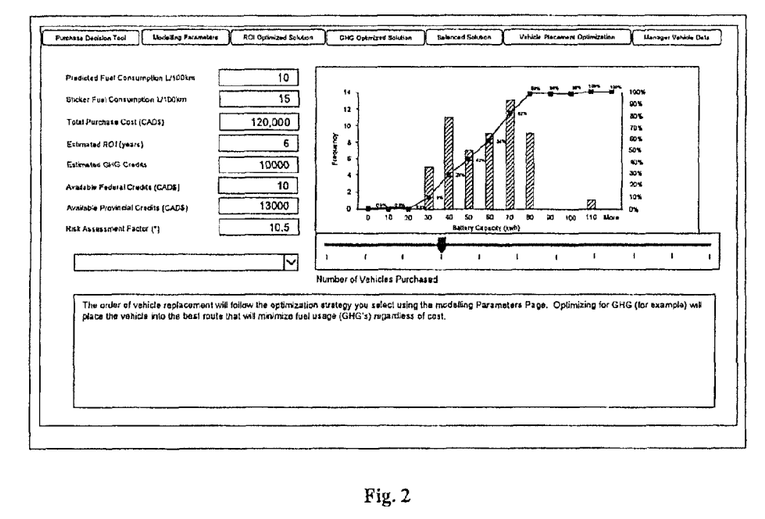
FIG. 2 illustrates an example of a user interface for enabling a user to access the system.

An example of a user interface is illustrated in FIG. 2. The drive cycle data may be inputted to the server using a 'manage vehicle data' tab, or alternatively drive cycle data may be data-bound from this tab in the case that it is auto-sent to the server; this data binding identifies and links individual telematic devices from each vehicle to the desired simulation scenario. The user interface may display a variety of optimized vehicle purchase solutions according to the chosen input criteria: the minimization of greenhouse gases, the minimization of lifetime costs, etc. The user interface may enable the user to have the ability to enter pertinent financial data that will allow the server to calculate the return-on-investment time period for the investment. In addition, the user interface may display government incentives for the purchase including the value of any greenhouse gas credits (if applicable).

The server of the present invention may be linked to at least three tools for enabling vehicle simulation, including: (1) an energy modeling tool linked to the server for generating energy consumption data that provides an energy consumption function of a vehicle under consideration—the energy modeling tool enables administrators to construct vehicle specific energy consumption simulation models that enable more accurate simulation of performance of specific vehicles based on real-world driving conditions, and also enables users to access pre-existing energy consumption simulation models for particular vehicles; (2) a data logging tool linked to vehicles (whether existing traditional vehicles, some or all of which a user may want to replace with more energy efficient vehicles or test vehicles consisting of more energy efficient vehicles) for collecting drive cycle data from real-world driving conditions; and (3) a fleet management tool for combining the energy consumption data with the drive cycle data to estimate the energy use of a vehicle under consideration. It should be understood that the energy consumption function of the vehicle under consideration can be used to derive vehicle range for the vehicle.

It should be understood that the "fleet management tool" is not used to manage dispatch of vehicles for example but rather enables a user to generate energy consumption data and/or vehicle range data tied to real world performance of actual vehicles in actual conditions experienced by the vehicle fleet of the user (or user's company or client), and further generate based on this data return on investment data and the like. The fleet management tool can be understood as a utility that enables easy application of data modeling based on the energy modeling tool to actual vehicle usage data as further explained below.

The fleet management tool combines the energy modeling data for a vehicle with the drive cycle data for the vehicle in order to estimate the fuel usage of a vehicle under consideration. Drive cycle data, obtained from a vehicle in use and reflective of real-world conditions, may comprise telemetric and informational data regarding the vehicle, including for example vehicle speed vs. time data. The drive cycle data may be recorded by the data logging tool from the vehicle, for example by GPS data-logging equipment linked to the vehicle or from the OBD port of the vehicle. Alternatively, automated wireless telematic equipment can be linked to the data logging tool for reporting drive cycle data to the server processing drive cycle data with the fleet management tool.

The drive cycle data may be augmented by estimation of road grade from captured GPS locational data and a suitable database of elevation data. The road grade can be used to further increase the accuracy of the simulation by taking in account the additional fuel required for inclined grade and lesser fuel required for declined grade driving. Other environmental factors include outside air temperature (affecting heating/cooling requirements, rain/snow/fog (affecting driving patterns), or, particularly for a facility, seasonal-specific operational changes (such as building air conditioning being on or off), day-to-day temperature variations, etc.

The drive cycle data may also be augmented by estimation of payload mass (which may vary during a particular drive cycle) from engine load data which may be captured from the OBD port. Once the engine torque of the vehicle is known, standard vehicle drag equations may be utilized to back-calculate the mass (and thus the payload) of the vehicle. This may be of importance for enhancing the accuracy of drive cycle data for delivery vehicles, for example.

Energy Modeling Tool

The energy modeling tool may comprise a vehicle energy modeling tool operable to apply a vehicle energy modeling algorithm, a battery lifetime modeling tool operable to apply a battery lifetime modeling algorithm, a vehicle maintenance cost modeling tool operable to apply a vehicle maintenance cost modeling algorithm, or any combination thereof. The vehicle energy modeling tool may comprise one or more component models, each generating component consumption data for various vehicle powertrain components, for example engine, transmission, batteries and motors. The component models may consist of empirical data, analytical equations, or any combination thereof. The component models calculate the energy conversion efficiency of the respective component and may be combined together to form a vehicle model for providing the total energy conversion efficiency vector (for example, efficiency vs. time) of the vehicle, which can be used to calculate the energy consumption and/or vehicle range of the vehicle. The energy modeling tool enables a range of energy consumption related parameters (including for determining vehicle range) to be built into vehicle specific simulation models, which parameters in turn define the scope of the vehicle specific energy consumption data and/or vehicle range data that can be generated based on the fleet management tool.

Battery lifetime modeling may also be important since the battery life of heavily electrified vehicles is crucial in evaluating any return on investment and since the battery life of these vehicles will typically be much less than the vehicle life. It is therefore of value to the fleet manager to have some estimate of battery replacement. Battery lifetime modeling can include data obtained from battery current vs. time as a result of virtual vehicle simulation in accordance with the methods described herein; battery internal temperature deduced from battery current and ambient temperature; battery history calculated from other battery models; and battery degradation extrapolated forward to generate lifetime estimation, which may be given in weeks.

The vehicle models can be provided by the manufacturer or compiled by a trusted third party. As new vehicles are released, the vehicle models are updated to include the new vehicles. The vehicle models may be validated with government testing data, data from the manufacturer, drive cycle data previously collected, and/or other vehicle models.

The input to the vehicle models may include grade, vehicle speed, and temperature as a function of time. The output of the model may include energy consumption, vehicle range, vehicle capabilities (such as ability to complete the specified route), and battery usage profiles.

The model build process may occur as follows. A test vehicle is instrumented in such a manner so that power and energy flow throughout the vehicle may be monitored to capture power data through each energy conversion/storage device. For example, as energy enters or leaves a battery, power flow may be monitored, or as energy enters a motor or voltage conversion device, the power into and out of the device may be logged. This captured data can then be synthesized with existing battery, motor, and converter (for example) data and algorithms to build an entire vehicle model that accurately predicts real-world vehicle performance. Generating accurate component (and vehicle) models is not trivial, and requires an experienced vehicle engineer to compile raw data into a reliable, trustworthy system.

For example, it has been found that for particular hybrid buses that a vehicle model can be simulated based on average vehicle speed and the frequency of stops. For such a model, real data measurements may be captured from the hybrid buses, including for example fuel consumption, vehicle speed, and the frequency of the stops. A polynomial equation can be derived to describe the relationship among the real data measurements. In the present example, the following polynomial equation was derived between the average vehicle speed and the frequency of the stops:

$$FuelConsumption\left[\frac{L}{100\text{km}}\right] =$$
$$a + \beta_{1.1}v_{ave} + \beta_{2.1}\omega_{stop} + \beta_{1.2}v_{ave}^2 + \beta_{2.2}\omega_{stop}^2 + \beta_{1.3}v_{ave}^3 + \beta_{2.3}\omega_{stop}^3$$

A least squares method of optimization may be used to find the optimal set of coefficients that enable the polynomial equation to predict the fuel consumption, for example, of a bus given the average vehicle speed and the frequency of the stops. It was found that simulations based on the derived polynomial equation outperform the analytic method.

Data Logging Tool

The data logging tool acquires and records (by storing in memory, for example) and/or transmits to the server for recording to the database the drive cycle data collected from a test vehicle, which comprises telemetric and informational data regarding the test vehicle, including for example locational data, vehicle speed data (including based on GPS data), mass data, and/or vehicle runtime information (such as On-Board Diagnostics data).

The data capture rate for most vehicles may be at least 2 Hz but can be any frequency based on the desired accuracy and technological capabilities of the system. The types of telemetric and informational data required for accurate simulation will depend on the vehicular application, however typically vehicle speed as a function of time should be acquired and recorded.

If the test vehicle has an associated vehicle model, then it is possible to estimate the fuel consumption of the test vehicle from the telemetric and informational data, and in particular from the test vehicle speed data. If the test vehicle mass changes during the collection of the telemetric and informational data, then the real-time fuel consumption trace can be used for mass-determination calculation.

Furthermore, on-vehicle non-tractive systems that consume significant amounts of energy (such as power-take off units, or secondary hydraulic systems) may require additional data capture in order to achieve sufficient modeling accuracy.

Data may be transferred automatically (wirelessly, for example) to the server or may be transferred manually by the driver or service personnel through a client computer to the server.

Fleet Management Tool

Figure 3:
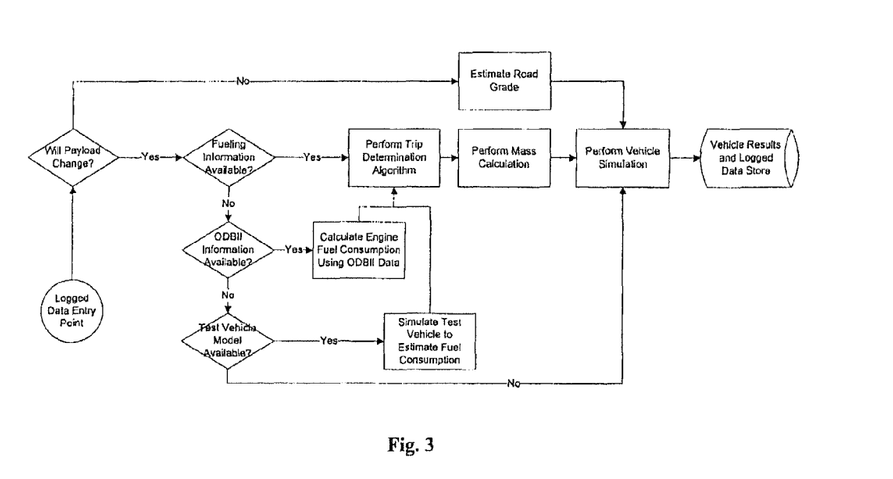
FIG. 3 illustrates the operations carried out in one implementation of the fleet management tool.

FIG. 3 illustrates the operations carried out in one implementation of the fleet management tool. The method can be comprised of a 5-step process, including: (i) the estimation of the test vehicle energy consumption and/or vehicle range; (ii) the division of the drive cycle data into 'trips'; (iii) the estimation of road grade; (iv) the estimation of the test vehicle mass; and (v) the simulation of the replacement vehicle.

The test vehicle's energy consumption and/or vehicle range is required in order to both provide a comparison to the vehicle under consideration, and to act as an input to a payload estimation algorithm. The test vehicle energy consumption data and/or vehicle range data may be logged directly from the test vehicle's data collection facility, such as its OBD port, or may be calculated using either the mass-air flow (MAF) or the manifold-air pressure (MAP), intake air temperature (IAT) and engine speed, using standard stoichiometric assumptions combined with fuel trim values. The data logging tool or the server can calculate the fuel consumption data using:

$$\text{fuelling rate}\left[\frac{g}{s}\right] = MAF\left[\frac{g}{s}\right] * \frac{1}{14.7} * LongTermTrim * ShortTermTrim$$

$$MAF\left[\frac{g}{s}\right] = VE * EngineDisplacement * \frac{RPM}{2*60} * \frac{MAP}{Rair*IAT}$$

Enhanced accuracy can be provided by considering variables including, for example, road grade and/or mass.

Under certain situations, road grade will have a non-negligible impact on the accuracy of the energy consumption simulation. The road grade effect may be removed by the use of GPS locational data for the trip, which when entered into an elevation database retrieves the elevation of the vehicle at a series of locations, which is used to generate a grade profile for the drive cycle data.

In certain applications the mass of the payload may change over the course of the drive cycle data. It may be necessary to detect at which point in the drive cycle data set the mass may have changed. The periods of constant payload mass may be called 'trips'. Trips may be determined from the drive cycle data as follows: (i) a key-off sequence may be considered the end of a trip while a key-on sequence may be considered the start of a trip; and/or (ii) a trip may be ended and a new trip started at the middle point of an extended period of idling.

Once it is determined that the vehicle will undergo a change in mass over its drive cycle data, then for each trip it may be assumed the mass is constant. The trip mass may be calculated using engine torque data. The engine torque at each data point of the drive cycle data may be calculated (or alternatively, referenced from the recorded drive cycle data) using an engine efficiency profile, the estimated engine fuel consumption, and the recorded engine speed. The instantaneous engine speed divided by the instantaneous wheel speed provides an effective gear ratio which can be used to estimate the tractive force applied to the ground. Approximations of the driveline component efficiencies may be used in this estimation process.

The standard equations of motion for a vehicle may then be utilized to generate a value of the 'instantaneous' mass (vehicle acceleration, rolling resistance, aerodynamic drag, and gravity forces are considered).

$$M=f(t)$$

M can then be filtered by a low-pass filter to produce a constant mass over the trip.

Simulation of the vehicle under consideration may be undertaken using a pre-built virtual vehicle model modified by the payload mass as deduced from the previous step, and controlled by the drive cycle as generated by the data-logging operation on the test vehicle. The simulation may comprise energy conservation principles applied to each powertrain component. Some of the relevant outputs of the simulation may be, for example, energy consumption, vehicle range, fueling/charging costs and/or refueling periodicity. In addition, there may be constraint violation outputs such as range/power/payload limits. These results, among other relevant data-points, may be stored in a database for later retrieval by the user or by the post-processing tool.

Simulation of the vehicle may also include a mechanism to deduce the accessory load of the vehicle, which may include cabin heating and cooling, and battery heating and cooling for example. The estimation of these loads may be important since these loads can drastically increase the total energy consumption of the vehicle. These loads may be estimated by using, for example, an estimate or measure of environmental factors such as the outside air temperature and solar radiation on the day of the vehicle logging event. These environmental factors can then be used to bias the energy consumption of the vehicle in one direction or the other; if the temperature is extremely warm or cold, it can be assumed that the driver would be more likely to use air conditioning or heating, and therefore a factor may be applied to increase energy consumption.

Post-Processing Tool

The post-processing tool enables the aggregation of a plurality of simulation results to post-processing data. In cases where the simulation scenario involves a plurality of test vehicles and/or vehicles under consideration (such as for fleet operations), the post-processing tool may group relevant data together into post-processing data and analyze the post-processing data to produce meaningful results that may have, for example, fleet-wide implications.

Post-processing data produced by the post-processing tool may be beneficial to at least three audiences: (i) the prospective vehicle purchaser who is attempting to understand the implications before their purchase; (ii) the vehicle purchaser who is attempting to understand the effectiveness of a vehicle after the purchase; and (iii) the vehicle manufacturer, who is attempting to both improve their vehicle design process and improve their vehicle pricing models.

The post-processing tool may be accessible to the purchaser and manufacturer for providing post-processing data that may include: performance data including overall fuel economy, overall fueling costs (ROI on new vehicle purchase), and the influence of driver behavior on fuel consumption (ROI on driver training); constraint data including the viability for the replacement vehicle(s) to accept the payload mass used in the test vehicle(s), the viability for the replacement vehicle to provide acceptable acceleration and deceleration performance as indicated by the test vehicle(s), and the viability for the replacement vehicle to meet the required driving distance before refueling is required; operational data including battery discharge/charge profiles (which when battery usage information is provided to the vehicle manufacturer can help determine battery warrantee costs), powertrain utilization of component power ratings compared to the power used during the cycles (which can assist OEM's improve their vehicle design), and component temperatures and duty cycles; productivity data (post-purchase) including automatic tracking of the increase/decrease in productivity effectiveness compared to the test vehicles; and fleet data including penetration level for a given vehicle, and matching of powertrain options between a given vehicle to the drivers or routes that are best able to provide a high ROI for that vehicle.

Example Workflow

The system of the present invention can be used by users such as fleet managers who are attempting to identify an ideal vehicle to purchase or salespeople who may use it as an attempt to solidify the rationale behind a purchase. In either case, the complex simulation and numerical analysis is processed by the server and hidden from the user.

A user may initially select one or more representative fleet vehicles that are to serve as test vehicles. These should be the vehicles under consideration for replacement. Typically these vehicles are pre-identified by the salesperson or fleet manager as suitable for electrified vehicle replacement due to route-specifics such as high idling time, slow speeds, low distance, etc.

The user then links data-loggers or telematic service data-stream devices to the test vehicles. The devices are operable to provide the server with drive cycle data. The drive cycle data is optimally collected for N weeks.

After N weeks of data collection, the user can select a simulation scenario. A simulation scenario comprises: (a) the selection of a number of vehicles along with specified particular vehicle options; (b) inputting of financial data, including cost of borrowing, existing maintenance costs, electricity costs, fuel costs, etc.; (c) inputting of time-speed traces from existing vehicles (which may be auto-captured GPS data); and (d) the selection of optimization goals including reduction in greenhouse gases, reduction in cost, a balanced (weighted) optimization, etc.

The server processes the simulation scenario with the drive cycle data and provides the user with a report that indicates the optimal vehicle choices for each route, along with an optimized deployment plan. The optimized deployment plan may suggest which vehicles should be deployed on which routes and how to re-deploy vehicles optimally as the batteries age. Also included may be the total lifetime cost of ownership and the vehicle life expectancy. The report may also be emailed to the customer or available online through the user interface once ready.

Purchase ROI Example

In one example, there may be three parties involved in collecting data and providing a simulation of vehicle energy use: (i) the purchaser or prospective purchaser, (ii) the vehicle manufacturer or sales agent, and (iii) a trusted third party administering the server of the present invention. The prospective purchaser may be considering the purchase of a replacement vehicle and may currently own and operate an existing vehicle (referred to hereinafter as the "test vehicle").

The vehicle manufacturer may provide component consumption data to the third party prior to approaching the purchaser. The third party may validate the component consumption data against a series of predetermined metrics and may approve or reject the accuracy of the simulation. The purchaser, when considering purchase of the replacement vehicle, enables the collection of drive cycle data from the test vehicle, for example using a GPS-logger and/or vehicle-connected data-logger. The drive cycle data is then provided to the third party in order to predict the energy usage of the replacement vehicle. In addition, energy consumption and/or vehicle range of the test vehicle may also be simulated if this information is not available from purchaser.

Additionally, the purchaser and/or the sales agent may be able to access the server to purchase one or more simulation scenarios that are specific to the purchaser. This unique scenario is created as a session on the server, and may be associated with a plurality of unique identifiers that are assigned to a plurality of telematics hardware devices. For example, each device, once linked to a vehicle, may transmit drive cycle data automatically through a wireless network to the host. This drive cycle data may be tagged with the unique identifier by the telematics hardware and may be associated at the server with the correct session, the correct vehicle, and/or a specific driver. The data recorded may include items such as, but not limited to, vehicle speed, mass, air flow, manifold air pressure, engine speed, locational data, etc. The server, upon receipt of sufficient drive-cycle data, may perform the selected simulations. The simulations may be of varying fidelity, as determined by the vehicle manufacturer or sales agent and the trusted third party. In general, the simulations will estimate energy consumption and vehicle range for each component in the powertrain at each time sample of the drive cycle. The efficiency of each component, along with the total energy consumption and vehicle range of the vehicle, can thus be estimated over the cycle. In addition, any vehicle-specific constraints, such as an inability to meet the drive cycle or to meet the required range may be determined.

Driver Training ROI Example

In another example for implementing the present invention, the drive cycle data can be used to determine the impact of a driver's driving habits on fuel consumption. This enables the driver or a fleet manager to acquire actionable intelligence about ROI on driver training vs. vehicle purchase or on driver training vs. no driver training. For example, in certain cases, it may be better to invest in driver training rather than (or in conjunction with) investing in an advanced vehicle. This implementation enables a driver or fleet manager to make such an evaluation by comparing an individual driver's fuel consumption with a number of other (real or otherwise) drivers on similar or identical routes.

One method to carry out the evaluation includes populating a speed limit database with locational data obtained from the test vehicle along with a speed limit value based on the route. From the speed limit database an idealized speed profile is generated using distance-based speed limits. At least two reference drivers are then produced, one for maximizing fuel economy and one for maximizing average speed. A simulation is carried out using the test vehicle and the reference drivers to generate a best-case scenario and a worst-case scenario. The end result is the display on a user interface of worst/best case scenario for the driver or fleet manager, allowing an understanding of ROI on driver training. The drive cycle data for the driver can also be used to show a comparison of the driver versus both the best and worst case scenarios.

Another method to carry out the evaluation includes building 'good' driver profiles and 'bad' driver profiles with parameterized equations. Each driver in the fleet is then associated with a set of parameters that encapsulate their behavior. By modifying the drive cycle data with the 'good' and 'bad' set of parameters, particular habits of each driver can be identified that, if changed, would affect ROI. This enables the driver or fleet operator to suggest stopping a certain behavior, or starting a certain behavior, to increase ROI.

Yet another method to carry out the evaluation includes ranking drivers against similar drivers. All drive cycle data for a specific vehicle (across fleets) can be subdivided into datasets corresponding to, for example, high speed/low speed/high urban, stop and go, etc. Assuming there is sufficient data, a plot can be made between 'cycle type' and fuel economy range for those vehicles. Then a plot of the driver under question can be made to enable a comparison between each driver and a number of other drivers driving similar cycles, allowing a reasonable ranking process.

As is apparent, mileage and therefore ROI can be improved by lowering average speeds to improve instantaneous fuel economy. Furthermore, ROI can be improved by prediction of braking events by the driver in order to "get off the gas earlier" and delay braking requirements. Better route selection can also facilitate braking avoidance and brisk acceleration up to cruising speed.

Commercial Delivery Fleet Manager Example

A particular example may be a fleet manager for a large commercial delivery fleet considering the purchase of one of a number of newly available electrified vehicles. The vehicle may have a higher initial cost than its conventional equivalent, but the reduction in fueling costs, along with the sales of greenhouse gas credits may create the opportunity for a positive return on the investment. In addition to possible cost savings, the manager may be assessing the possibility of increased maintenance costs, the possibility of battery replacement, and if the electric vehicle has the power and range to complete his routes.

The manager may be aware that using the advertised fuel economy numbers for the electrified vehicles to develop a business case can result in significant error for the return on investment calculation. The manager may wish to identify an ideal vehicle that meets the purchase criteria and then to determine which routes are most ideally suited for placement.

The manager may link data logging devices and GPS devices to test vehicles and upload the drive cycle data from these test vehicles to the server for a given period. At the end of this period, the manager may purchase a simulation package from the trusted third party that produces energy consumption and/or vehicle range estimates for a number of vehicles that meet the purchasing criteria. These vehicles may be direct competitors with each other, and are possibly made by different manufacturers. Even though the data is captured over a small time window, the energy consumption and/or vehicle range over the year (as temperature changes) can be estimated accurately and by inputting financial data the return on investment period can be calculated. This information is presented to the manager using an auto-generated online report. Further, the server can recommend a sequence of deployment over the manager's delivery routes that provide the lowest lifetime operating cost, and the minimization of project risk.

In addition to energy consumption costs and vehicle range estimates, the server can estimate the annual maintenance costs for each vehicle based on the uploaded drive cycle, manufacturer supplied data, and historical performance data.

Another example of a fleet manager for a large commercial delivery fleet includes an evaluation of current vehicles and current drivers. The fleet manager may be interested in determining which of the current vehicles in the fleet have the greatest idling time relative to their running time. This information may be useful to better deploy vehicles (for example, deploying more fuel efficient vehicles to higher idle time routes, etc.).

Figure 4:
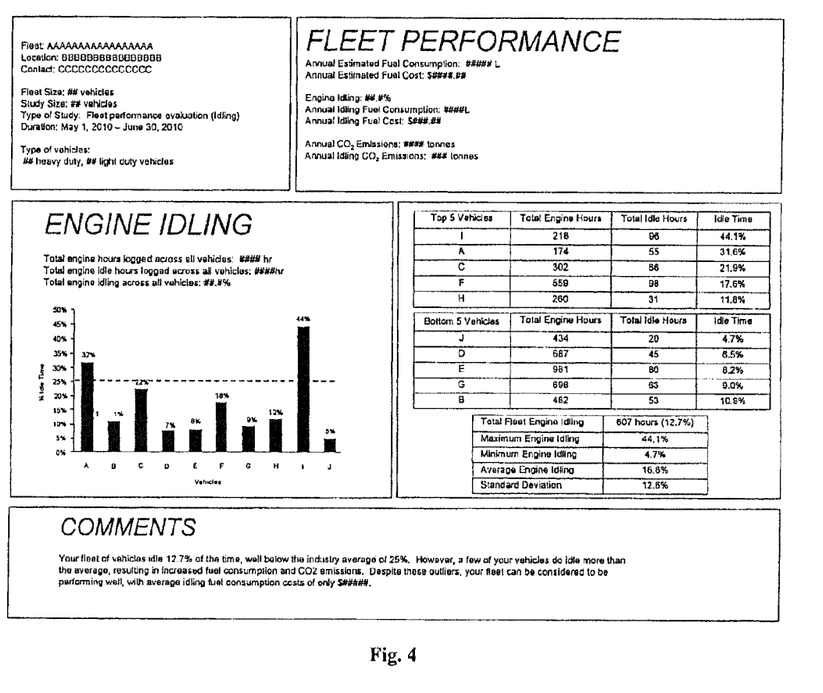
FIG. 4 illustrates an exemplary report generated in accordance with the present invention.

For example, FIG. 4 illustrates an example report generated for evaluating idle time of fleet vehicles. The fleet manager may select a particular duration for collecting drive cycle data from the vehicles. The drive cycle data may be analyzed to determine: (i) the total engine-on hours of each vehicle; and (ii) the total idle hours of each vehicle. These drive cycle data items can be used to generate a percentage of idle time relative to total engine-on time. All of this information can be presented in the report, for example in tabular or graphical format as shown in FIG. 4. Further, by combining the drive cycle data with energy modelling data for the particular vehicle, the cost and pollution output (for example, $CO_2$ emissions) can be determined and presented in the report. Over time, across fleets, this information may be collected, enabling a comparison for any given fleet with the average of all fleets for a particular vehicle or for all vehicles.

Commercial Vehicle Dealership Example

Another example is a commercial vehicle dealership that is attempting to sell an electrified vehicle model to a delivery fleet, or generally trying to increase the marketability of its vehicles. This particular vehicle model may have a plurality of different battery capacity options, for example 10 kWh, 30 kWh, 50 kWh, and 80 kWh. The dealership can capture drive cycle data over a trial period from all vehicles in the fleet in question, and uploads it to the server.

The fleet may wish to purchase all its vehicles with the same battery size option to optimize maintenance. There may be a 'global optimization' simulation, where the total cost of ownership for all routes is minimized under the constraint of a single battery option for all vehicles. This total cost of ownership accounts for purchase costs, energy costs, maintenance costs, and warrantee costs. Alternatively, if the fleet was willing to accept different battery sizes for the vehicles, the dealer can purchase a 'local optimization' simulation, whereby each route may have a different battery size, thereby reducing capital expenditure since the battery size for shorter routes can be smaller. Further recommendations may be made on how to manage the vehicles once in the fleet (where to move them as the batteries age), and when to scrap them.

Since battery life for electrified vehicles is heavily dependent on the duty cycle and ambient temperature, the dealership may choose to modify the battery warrantee based upon the fleet specific driving data in order to reduce prices or improve profit margins.

Figure 5:
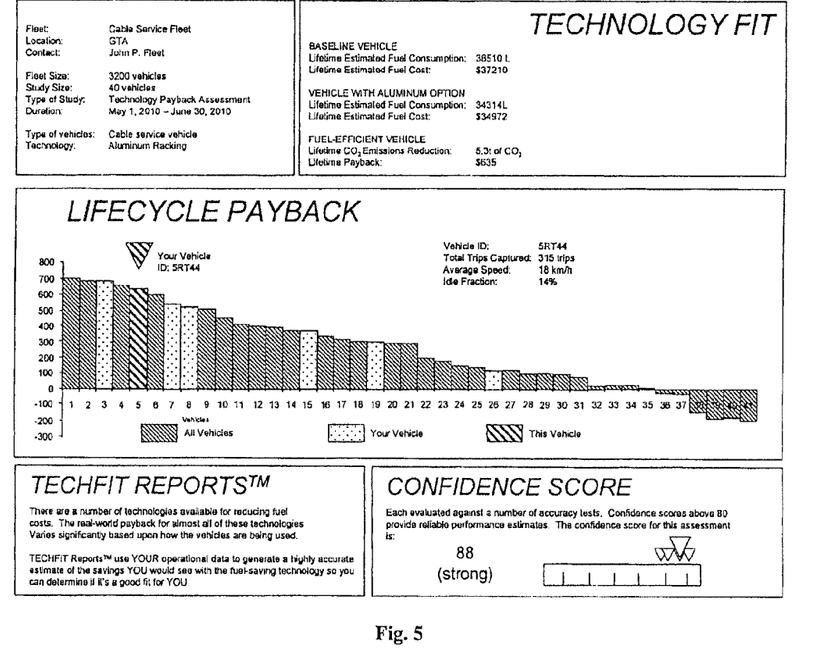
FIG. 5 illustrates an exemplary report generated in accordance with the present invention.

Another example of a commercial vehicle dealership includes providing cost of ownership information corresponding to the prospective purchase of one or more optional components of a vehicle. For example, particular optional components may impact fuel consumption of a vehicle. Energy modelling data may be provided by the commercial vehicle dealership (or the manufacturer of the vehicle and/or component) enabling a prospective purchaser to evaluate drive cycle data against one or more component selections. FIG. 5 illustrates a report generated for evaluating the cost of ownership of a vehicle with an optional component. Based on drive cycle data, annual, lifetime, or other period-based cost information can be generated and reported to the prospective purchaser. This information can further be used to determine whether, and if so how long, the cost of the component can be recovered over the lifetime of the vehicle, enabling the prospective purchaser to determine whether the purchase of the component is worthwhile. A confidence score can also be provided to enable the prospective purchaser to determine how accurate the simulation is. The confidence score may be developed over time by logging many vehicles, simulating those same vehicles and comparing their actual fuel consumption to the simulated fuel consumption. This provides some indication of how accurately the simulation predicts real world fuel consumption for a given type of cycle (urban or rural, for example), or a given type of consumer (fleet vs. individual, for example), to enable the user to understand the potential accuracy of the simulation.

Illustrative Example

In one particular illustrative example, a fleet manager is evaluating the purchase of an electric delivery vehicle that can be configured with one of four battery options. The fleet manager collects 80 drive cycles from the fleet vehicles (automatically using a telematic solution). The manufacturer build four different virtual vehicles, one vehicle for each battery option, but the vehicles are identical in all other ways.

Initially, the manufacturer runs a check to exclude the cycles that preclude particular battery options. The remaining options may be termed TotalFeasibleSolutions (the number of simulations that need to be run). This will reduce the total simulations to be run.

The simulations are processed by fixed efficiency calculations. For a simple vehicle model, the calculation is given by:

Total Force$(t)$=$F$aero$(t)$+$F$tireresistance$(t)$+$F$grade$(t)$+$F$accel

Assuming a fixed battery efficiency of 95% (or any other configurable number) and a fixed motor efficiency of 80% (or any other configurable number), the power needed for each course can be calculated by:

$$\text{Total Battery Chemical Power}(t) = \text{Total} \frac{\frac{\text{Force}(t)}{\text{BatteryEfficiency}}}{\text{MotorEfficiency}}$$

The minimum battery size based on energy requirements can be calculated by:

$$\text{Battery Capacity} \geq \int \text{TotalBatteryChemicalPower}(t)dt$$

The minimum battery size based on power requirements for the course can be calculated by:

$$\text{BatteryPower} \geq \max(\text{TotalBatteryChemicalPower}(t))$$

Thus the battery options for each route can be constrained to the battery capacity and battery power minimums as indicated in the previous two steps.

Simulations are then run on all 80 sets of drive cycle data for each feasible battery option. These simulations correspond to "start of battery life" simulations and are only valid for the fresh battery. Next, a calculation of battery life simulations produce "battery State-of-Health" estimation, which includes a test of the vehicle battery against a predetermined set of criteria in order to know when that battery will fail to meet performance expectations. These criteria may be: (i) unable to complete route due to capacity loss; (ii) unable to meet acceleration or grade-ability performance due to power fade; (iii) unable to provide sufficient voltage for proper vehicle operation; and/or (iv) other criteria as indicated by user. The end result of this simulation and set of criteria tests is a lifetime prognosis, which is an estimation of how long that battery will last in that vehicle.

Given the lifetime prognosis, an optimization can be performed to determine how to allocate and reallocate vehicles in the fleet, to enable vehicles whose range decreases to continue to be used for shorter routes before having to sell the vehicle for scrap. This optimization can be a non-linear optimization using the battery degradation rates on each route, the per year operating cost of the vehicle on each route, and the scrap value of the battery. The objective will be to minimize the lifetime cost of the entire fleet for this set of vehicles. The optimization can be given by:

$$LifeTime \text{ cost} = \sum_{i=0}^{numvehicles} \left\{ CapitalCosts + \sum_{age_i=0}^{ExpectedLife_i} [AnnualCosts(\text{route}, age_i)] - ScrapValue(ExpectedLife_i) \right\}$$

where:

$$\text{Expected Life}_i = f(\text{route})$$

The annual cost would include fuel/electricity usage, maintenance costs, insurance costs, etc. Table 1 illustrates one potential end result for the calculations and optimizations. The allocations and reallocations (which in this case occurs in 2 years) are also provided.

TABLE 1

| INPUT Route Number | INPUT Distance (km) | RESULT Ideal Solution | RECOMMENDATION Estimated Life on Route (years) | RECOMMENDATION 2 year deploy Recommendation | RESULT Lifetime Costs |
|---|---|---|---|---|---|
| 1 | 20-30 | 10 kwhr | 4 | Move to Route 4 | $80,000 |
| 2 | 20-60 | 50 kwhr | 5 | Move to Route 1 | $85,000 |
| 3 | 70-90 | 80 kwhr | 2 | Move to Route 2 | $65,000 |
| 4 | 10-20 | 10 kwhr | 2 | Replace Battery | $140,000 |

In total, the customer gets an estimation of the total lifetime costs of the vehicle purchase, along with recommendations for how to move the vehicles throughout his routes, and when to scrap the vehicles in order to maximize his return on investment.

What is claimed is:

1. A system for simulating energy use of at least one vehicle, the system comprising at least one computing device configured to:
   receive drive cycle data collected during real-world driving of the at least one vehicle;
   receive engine torque information associated with the real-world driving of the at least one vehicle;
   estimate vehicle payload mass of the at least one vehicle based at least partly on the respective received engine torque information; and
   estimate energy use of the at least one vehicle based at least partly on the respective drive cycle data, the respective engine torque information, and the estimated vehicle payload mass.

2. The system of claim 1 wherein the at least one computing device is configured to estimate road grade information based at least partly on the drive cycle data, and wherein the estimation of vehicle payload mass of the at least one vehicle is further based at least partly on the respective estimated road grade information.

3. The system of claim 2 wherein the estimation of the road grade information is further based at least partly on a correspondence of GPS location information associated with the respective drive cycle data and a database of road elevation information.

4. The system of claim 1 wherein the at least one computing device is configured to apply a low pass filter to the estimated vehicle payload mass prior to the estimation of the energy use.

5. The system of claim 1 wherein the drive cycle data comprises vehicle trip data for a plurality of vehicle trips of the at least one vehicle;
   the received engine torque information comprises engine torque information for each of the plurality of vehicle trips by the at least one vehicle;
   the estimation of the vehicle payload mass comprises the at least one computing device configured to estimate the vehicle payload mass of the at least one vehicle for each of the plurality of vehicle trips by the at least one vehicle based at least partly on the respective received engine torque information for the respective vehicle trip; and
   the estimation of the energy use comprises the at least one computing device configured to estimate the energy use of the at least one vehicle for each of the plurality of vehicle trips by the at least one vehicle based at least partly on the respective drive cycle data for the respective vehicle trip, the respective engine torque information for the respective vehicle trip, and the respective estimated vehicle payload mass for the respective vehicle trip.

6. The system of claim 5 wherein a beginning of each respective vehicle trip indicates the respective at least one vehicle entering an on state.

7. The system of claim 5 wherein an end of each respective vehicle trip indicates the respective at least one vehicle entering an off state.

8. The system of claim 5 wherein an ending of a respective vehicle trip and a beginning of another respective vehicle trip indicates the respective at least one vehicle having idled for a predetermined period of time.

9. The system of claim 5 wherein the at least one computing device is configured to apply a low pass filter to the respective estimated vehicle payload mass for the respective vehicle trip prior to the estimation of the energy use for the respective vehicle trip.

10. The system of claim 1 wherein the at least one computing device is configured to estimate the accessory load of the at least one vehicle based at least partly on environmental measurements at the at least one vehicle; and wherein the estimation of the energy use of the at least one vehicle is further based at least partly on the respective estimated accessory load of the at least one vehicle.

11. The system of claim 1 wherein the at least one computing device is configured to aggregate the estimated energy use of the at least one vehicle to produce aggregated estimated energy use results.

12. The system of claim 1 wherein the at least one computing device is in communication with the one or more vehicles over a communications network.

13. The system of claim 1 wherein the drive cycle data is collected by a data logging tool associated with the one or more vehicles.

14. The system of claim 13 wherein the data logging tool includes a memory for storing the drive cycle data prior to the data logging tool communicating the drive cycle data to the at least one computing device.

15. The system of claim 1 wherein the drive cycle data includes telematic and informational data.

16. The system of claim 15 wherein the telematic data includes speed versus time, GPS, road grade, or any combination thereof.

17. The system of claim 15 wherein the informational data includes environmental factors related to the real-world driving conditions, vehicle mass, torque, drag, temperature, or any combination thereof.

18. The system of claim 1 wherein at least one computing device is configured to estimate a vehicle range of the at least one vehicle based at least partly on the estimated energy use of the at least one vehicle.

19. A method for simulating energy use of at least one vehicle, the method performed by at least one computing device, the method comprising:
   receiving drive cycle data collected during real-world driving of the at least one vehicle;
   receiving engine torque information associated with the real-world driving of the at least one vehicle;

estimating vehicle payload mass of the at least one vehicle based at least partly on the respective received engine torque information; and estimating energy use of the at least one vehicle based at least partly on the respective drive cycle data, the respective engine torque information, and the estimated vehicle payload mass.

20. The method of claim 19 wherein the estimation of the road grade information is based at least partly on the drive cycle data, and wherein the estimation of vehicle payload mass of the at least one vehicle is further based at least partly on the respective estimated road grade information.

21. The method of claim 20 wherein the estimation of the road grade information is further based at least partly on a correspondence of GPS location information associated with the respective drive cycle data and a database of road elevation information.

22. The method of claim 19 comprising applying a low pass filter to the estimated vehicle payload mass prior to the estimation of the energy use.

23. The method of claim 19 wherein the drive cycle data comprises vehicle trip data for a plurality of vehicle trips of the at least one vehicle;
the received engine torque information comprises engine torque information for each of the plurality of vehicle trips by the at least one vehicle;
the estimation of the vehicle payload mass comprises estimating the vehicle payload mass of the at least one vehicle for each of the plurality of vehicle trips by the at least one vehicle based at least partly on the respective received engine torque information for the respective vehicle trip;
the estimation of the energy use comprises estimating the energy use of the at least one vehicle for each of the plurality of vehicle trips by the at least one vehicle based at least partly on the respective drive cycle data for the respective vehicle trip, the respective engine torque information for the respective vehicle trip, and the respective estimated vehicle payload mass for the respective vehicle trip.

24. The method of claim 23 wherein a beginning of each respective vehicle trip indicates the respective at least one vehicle entering an on state.

25. The method of claim 23 wherein an end of each respective vehicle trip indicates the respective at least one vehicle entering an off state.

26. The method of claim 23 wherein an ending of a respective vehicle trip and a beginning of another respective vehicle trip indicates the respective at least one vehicle having idled for a predetermined period of time.

27. The method of claim 23 comprising applying a low pass filter to the respective estimated vehicle payload mass for the respective vehicle trip prior to the estimation of the energy use for the respective vehicle trip.

28. The method of claim 19 comprising estimating the accessory load of the at least one vehicle based at least partly on environmental measurements at the at least one vehicle; and wherein the estimation of the energy use of the at least one vehicle is further based at least partly on the respective estimated accessory load of the at least one vehicle.

29. The method of claim 19 comprising aggregating the estimated energy use of the at least one vehicle to produce aggregated estimated energy use results.

30. The method of claim 19 wherein the at least one computing device is in communication with the one or more vehicles over a communications network.

31. The method of claim 19 wherein the drive cycle data is collected by a data logging tool associated with the one or more vehicles.

32. The method of claim 31 wherein the data logging tool includes a memory for storing the drive cycle data prior to the data logging tool communicating the drive cycle data to the at least one computing device.

33. The method of claim 19 wherein the drive cycle data includes telematic and informational data.

34. The method of claim 33 wherein the telematic data includes speed versus time, GPS, road grade, or any combination thereof.

35. The method of claim 33 wherein the informational data includes environmental factors related to the real-world driving conditions, vehicle mass, torque, drag, temperature, or any combination thereof.

36. The method of claim 19 comprising estimating a vehicle range of the at least one vehicle based at least partly on the estimated energy use of the at least one vehicle.

37. A non-transitory computer program product tangibly embodying code that, when executed by a processor, causes the processor to carry out the method of claim 19.

* * * * *